ial distribution means and gas agitation system; and

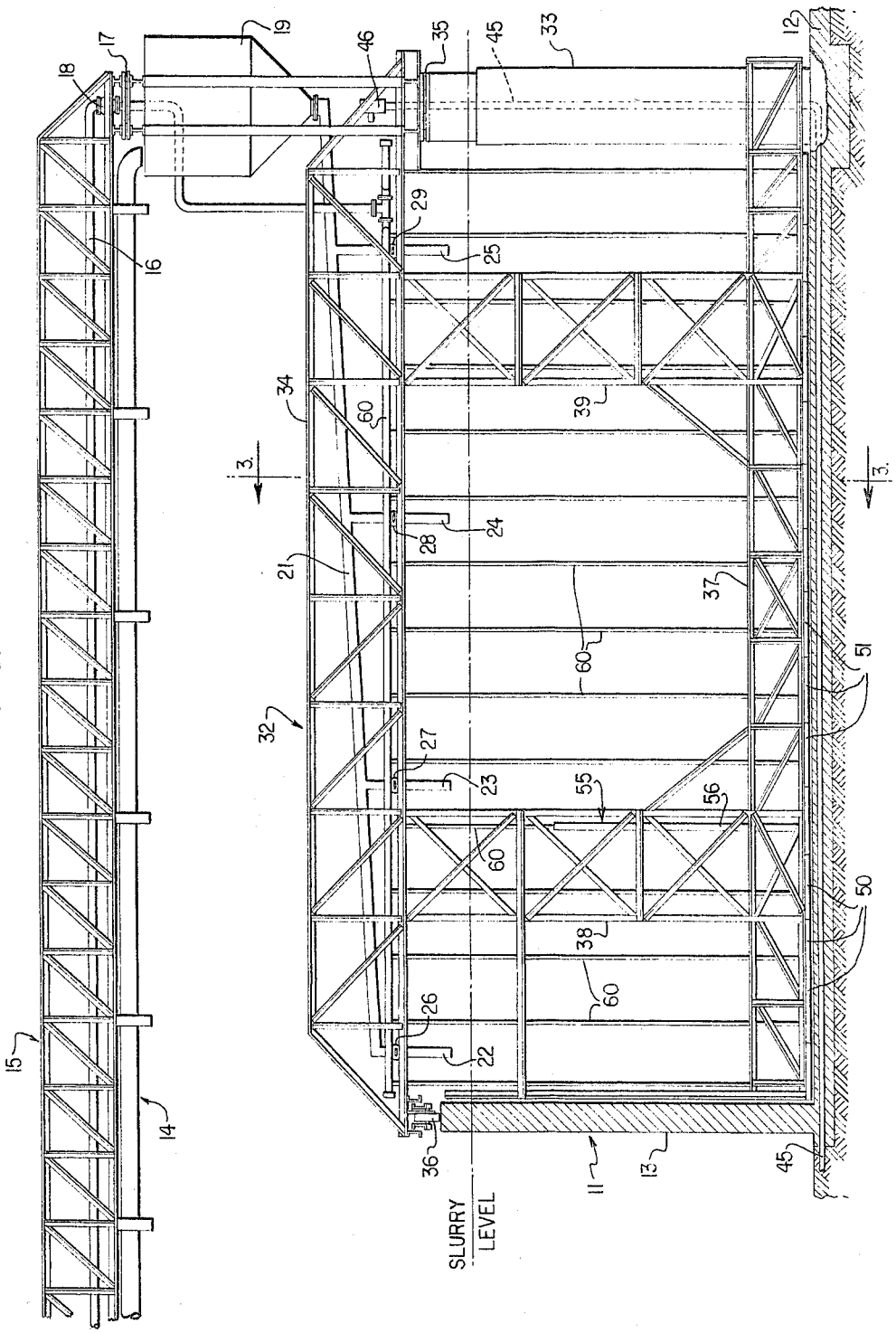

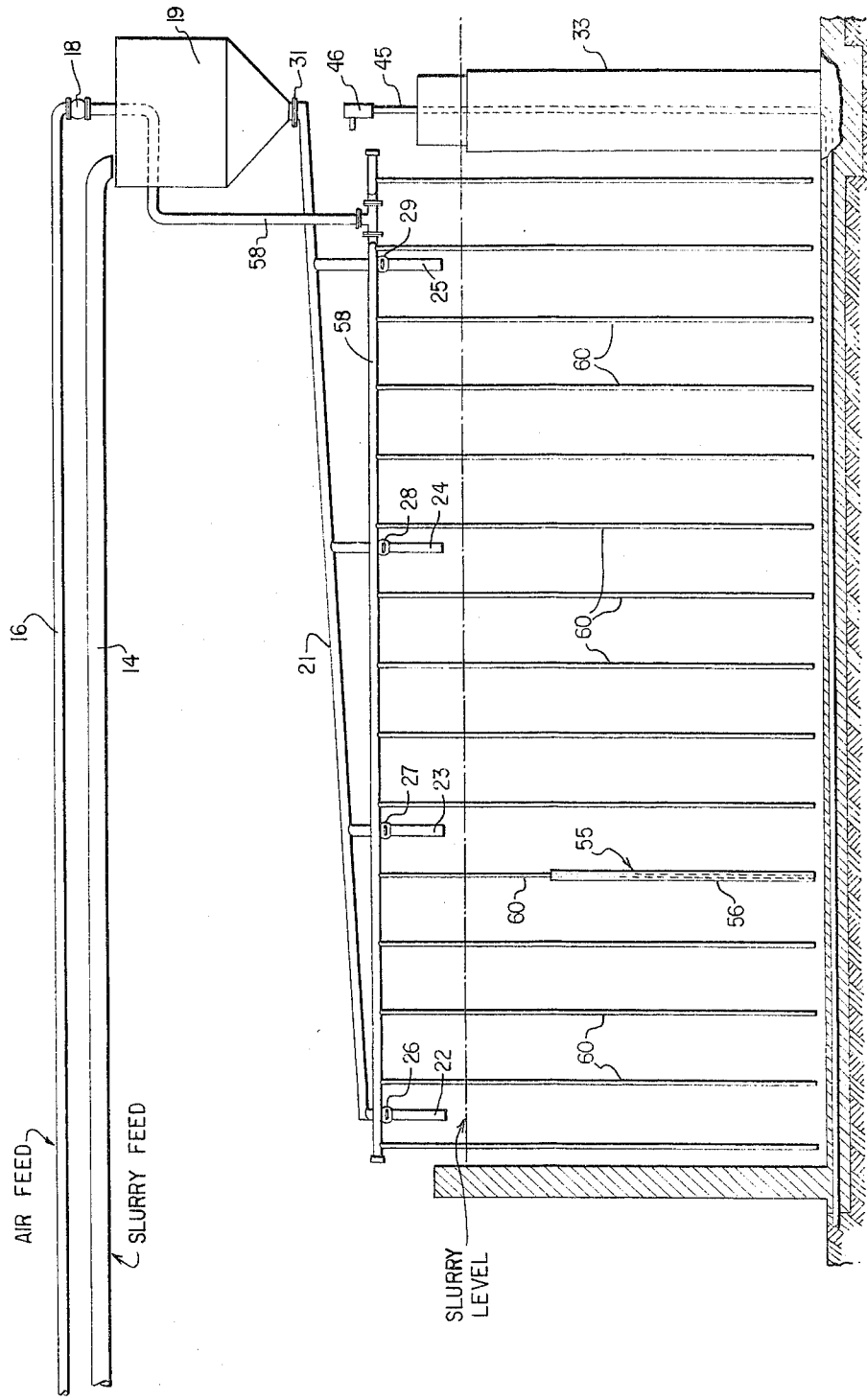

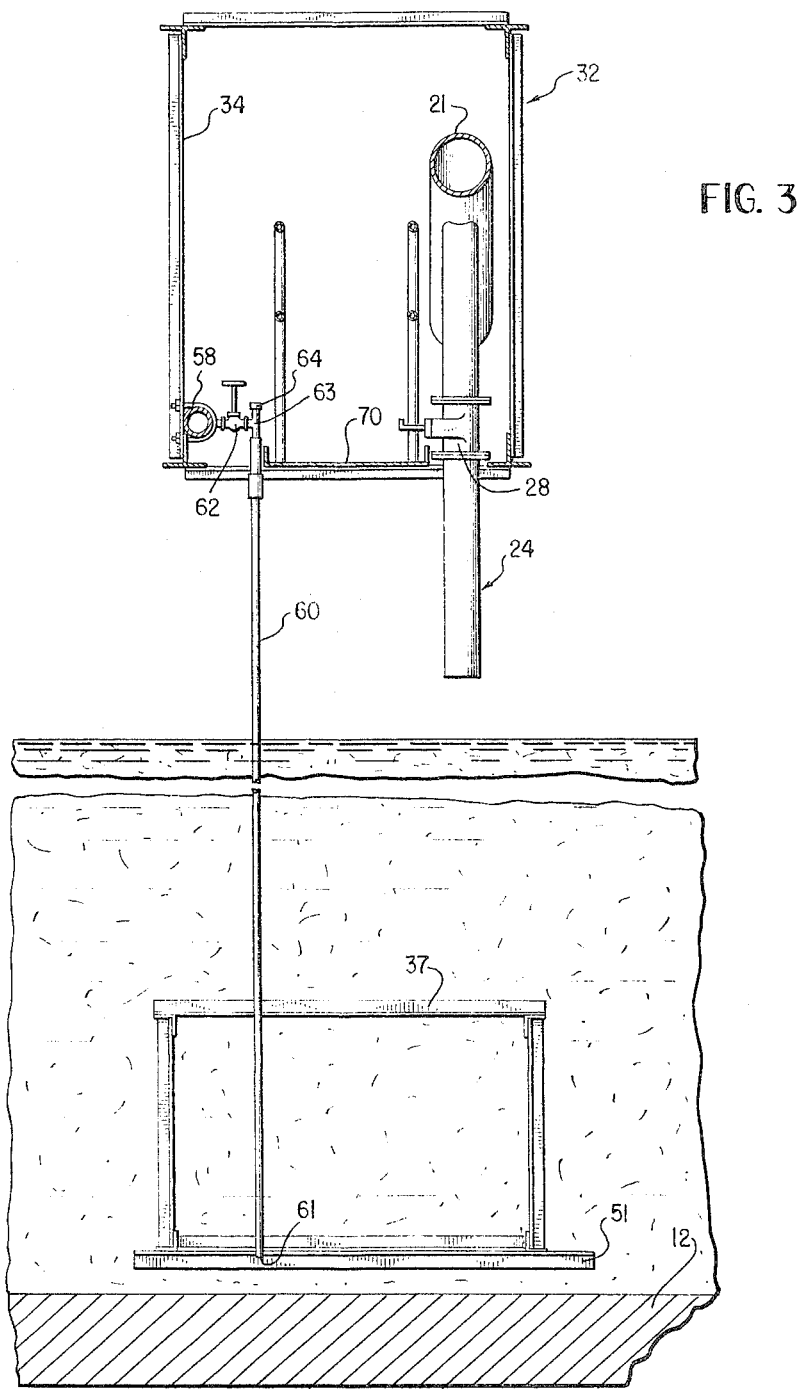

United States Patent Office 3,288,444
Patented Nov. 29, 1966

3,288,444
SLURRY MIXING APPARATUS
Thomas J. Tillett, Ambler, and John C. Lodholz, Perkasie, Pa., assignors to Link-Belt Company, a corporation of Illinois
Filed Oct. 22, 1965, Ser. No. 501,533
11 Claims. (Cl. 259—151)

This invention relates to improvements in apparatus for mixing and storing slurries. In the class of apparatus herein contemplated, the slurry is continuously agitated jointly by means of compressed gas introduced into the slurrry mixture at the bottom of the tank and by agitating blades mounted near the bottom of the tank for establishing the slurry as a homogeneous mixture.

This type apparatus is required, for example, in equipment for the wet process manufacturing of cement. In this process ground limestone plus other additives such as alumina, iron and silica are mixed with water to form a slurry. The materials are fed into a mixing tank and agitated until a homogeneous slurry is produced at all depths in the tank.

The prior art slurry agitators have presented a number of problems. With gas agitation this was usually accomplished by introducing gas distributed through long submerged headers carrying nozzles or being porous themselves. These frequently become clogged with the material particles. Once the gas distribution means became clogged, cleaning required complete draining of the slurry tank to gain access to the normally submerged headers. Even when the gas distribution means was not completely clogged, uneven distribution of the gas caused by partial clogging was common with a resultant prolonged delay in obtaining a homogeneous slurry.

Another major problem of prior art equipment has been extremely long mixing time required to achieve a homogeneous slurry. In such equipment the slurry was usually fed into the mixing tank from a tangential feed device near the outer portion of the tank. With this type feed it would take a matter of many hours or even days to mix a tank to the required homogeneous mixture. Even after a homogeneous mixture had been acquired, any correction to the proportions of the mixture, calling for adding materials would require considerable additional time to obtain a complete remixing of the tank contents.

To overcome these prior art problems is the primary object of this invention. This invention avoids and solves the foregoing problems, by providing distribution means which will distribute the material feed into the tank through a number of adjustable distributing outlets, so placed as to distribute the slurry over essentially the entire surface of the tank. The distribution means is rotatable about the center of the tank so as to secure even distribution all around the tank surface. The problem of clogging in the air distribution system is solved by providing long vertical gas supply pipes which can be rodded clean from the surface of the slurry without having to drain the tank.

The above and other features and advantages of the instant invention will become more readily apparent by reference to the accompanying drawings in which a preferred embodiment is disclosed by way of example, various modifications and changes of details thereof being contemplated within the scope of the appended claims. The apparatus of the invention is illustrated on the accompanying drawings in which:

FIGURE 1 is a partial sectional view of a center pier type slurry mixing tank embodying the invention;

FIGURE 2 is a view similar to FIGURE 1 but with the structural supports removed to more clearly show the material distribution means and gas agitation system; and FIGURE 3 is a section taken at line 3—3 of FIGURE 1.

Referring to the drawings illustrating a preferred embodiment of this invention, there is provided a cylindrical tank 11 having a bottom 12 and an upstanding peripheral wall 13 for containing materials to be mixed into the slurry. A feed pipe 14 to introduce materials into the tank is carried on a stationary support 15 which support also carries a gas feed line 16. Support 15 is connected to the rotating part of the agitator by means of upper bearing 17. The gas feed line 16 is connected to the rotating part of the gas feed system by a swivel pipe joint 18. The material is fed from feed pipe 14 into a surge hopper 19 where it is collected prior to being fed into the material distribution system.

The material distribution system, as can best be seen in FIGURE 2, comprises a downwardly sloping pipe 21 leading from the bottom of hopper 19 and having distribution outlets 22, 23, 24 and 25 extending downwardly at spaced positions along pipe 21. Each of these distribution outlets preferably has a separate flow control means, such as a valve, gate or the like, as at 26, 27, 28 and 29 respectively. Material distribution means comprising pipe 21 and vertical outlets 22, 23, 24 and 25 are connected to the surge hopper 19 by a flanged coupling 31. The slurry tank 11 is, of course, provided with a suitable discharge outlet (not shown) for discharging the slurry when the mixing thereof has been completed.

The material distribution system, as well as the gas distribution system, is supported by a bridge 32 extending from an upstanding column 33 disposed at the center of the tank to the outer tank wall 13.

The bridge 32 in the embodiment illustrated includes an upper truss 34 which extends from and is supported on the upper end of column 33 by a bearing 35. The upper truss 34 of the bridge supports the material distribution system including hopper 19, pipe 21 and its outlets 22, 23, 24, and 25. Truss 34 extends outwardly from column 33 with its outer end supported on wheels 36 which engage with and ride along the upper edge of the outer tank wall 13. Wheels 36 are appropriately driven by an electric motor drive (not shown). Their driving engagement with the tank wall 13 acts to rotate the bridge 32 about the central column 33 within the tank.

The bridge 32 is completed by a lower truss 37 which is suspended beneath truss 34 by means of frames 38 and 39 such that the trusses 34 and 37 rotate together in response to driving action of the wheels 36 supporting the outer end of the bridge.

Although the embodiment illustrated, employing driven wheels engaging the outer wall of the tank, is particularly well suited for large installations having a tank of substantial diameter, in smaller diameter tanks the bridge arm need not extend out to the outer tank wall but may be solely supported from the center column. With such an alternative structure a center drive for rotating the bridge arm is provided on the column and a stationary walkway bridge spans between the tank wall and column overlying the rotary path of movement of the bridge arm. Servicing of equipment carried by the bridge arm can be carried out from the stationary walkway bridge with the bridge arm stopped in its rotary path to lie beneath the walkway bridge.

Current for the electrical drive employed in rotating the bridge 32 is suitably supplied through electrical cables 45 which extend through the bottom 12 of the tank and upwardly through the center of column 33. At the top of the column the cables pass through bearing 35 and the power is transferred to the rotating bridge by means of a suitable current collector assembly 46 whereby power is transmited from the cables 45 to the electrical lines carried by the bridge.

The bottom of the bridge 32, formed by truss 37, carries two series of scraper blades 50 and 51. The blades of each series are parallel to each other and each series is mounted to extend at an angle to the axial length of the bridge. A gas lift 55, described more fully hereinafter, is disposed to extend down between the two series of blades 50 and 51. As the bridge is rotated about column 33, the scraper blades tends to move the material along the bottom of the tank agitating the material to promote mixing of the desired slurry. The series of blades 50 disposed beneath truss 37 toward the outer end of the bridge are inclined at an angle to the axial bridge length such that the material adjacent the tank bottom is urged as the bridge rotates, inwardly toward the gas lift 55. On the other hand, the series of blades 51 spaced along truss 37 inwardly from gas lift 55 are angled relative to the axial bridge length so, that the bridge rotates material is urged along the tank bottom outwardly toward the gas lift 55. The gas lift picks up the material brought to it by the action of the scraper blades and elevates it toward the surface of the slurry being mixed to promote rapid slurry mixing.

The gas agitation system for the equipment is supplied with gas by way of feed line 16 through swivel joint 18 to gas supply header 58 supported on truss 34 of bridge 32. A plurality of straight supply pipes 60 are mounted on bridge 32 leading downwardly to gas jets at the bottom of the bridge beneath truss 37.

As best seen in FIGURE 3, gas header 58 is connected to each vertical supply pipe 60 through a valve 62 and tee 63. The vertical supply pipe 60 is a long straight vertical pipe terminating in a gas jet formed by the lower open end 61. This arrangement allows the compressed gas fed to pipe 60 to be directed as a jet against the bottom 12 of the tank 11, thereby serving to iniitally agitate the slurry and again agitate the slurry as the gas bubbles rise upwardly through the material in the tank.

The tee 63 has one end opening upwardly in line with supply pipe 60. This upper end is closed by pipe cap 64. When it is desired to clean each gas agitation supply pipe 60, the valve 62 is closed thus shutting off the compressed gas feed. This may conventiently be done from walkway 70 carried by truss 34 of bridge 32. The pipe cap 64 is then removed and a long straight rod is forced downwardly through pipe 49 clearing it of any clogging mater. The pipe cap 64 may then be replaced and the valve 62 opened. Thus the gas agitation means may be cleared of any encumberances without shutting down and draining the slurry tank.

The gas lift 55 is provided about two-thirds of the radial distance from the center column 33 to the tank wall 13. It comprises a large diameter pipe 56 enclosing one of the similar diameter gas supply pipes 60. The gas leaving this pipe 60 flows up the annular space between the pipe 56 and the pipe 60 carrying material with it and discharging the material from the top of pipe 56. The pipe 56 preferably extends about two-thirds of the distance from the tank bottom 12 to the normal upper level of the slurry. This gas lift aids in the mixing by lifting the heavier components from the bottom to the top portion of the tank. If desired, more than one gas lift may be used.

The material feed distribution control valve 28 for pipe 24 may be clearly seen in FIGURE 3. This valve, and of course the other control valves 26, 27 and 29, may conveniently be reached from the walkway 70 on truss 34 of bridge 32. By regulating the valves 26, 27, 28 and 29 an even distribution of the material may be obtained across the entire tank surface. If additional material has to be added to a batch once the batch has already been mixed, remixing time is much shorter since the new material is added with uniform distribution over the surface to the tank. Homogeneity of the batch may be restored much more quickly than if the material were all added at a single point. With the proper regulation of the valves 26, 27, 28 and 29 very accurate distribution and control can be maintained.

It is to be understood that the form of invention herein shown and described is to be taken only as a preferred embodiment of the invention and that various changes and modifications in the arrangement of the components may be restored to without departing from the spirit or scope of the appended claims.

We claim:

1. Slurry mixing apparatus adapted for use in wet process cement manufacturing comprising:
   a tank to retain slurry during mixing,
   an upstanding column disposed centrally of said tank,
   a slurry mixing arm rotatably attached to and extending radially from said column,
   rotating means for rotating said slurry mixing arm about said upstanding column,
   gas agitation means comprising downwardly directed gas jets adjacent the bottom of said tank at positions spaced radially from said column and carried by said slurry mixing arm for agitating and mixing said slurry,
   a gas supply header extending along said arm and communicating with each of said gas jets for supplying gas to said jets through a straight length of supply pipe extending from each said gas jet to a point above the normal upper surface of the slurry to be treated, removable cap means overlying the upper end of each supply pipe whereby upon removal of said cap means said pipe and gas jets may be rodded to clear clogging of said jet without emptying the tank,
   and means for introducing material into said tank and for discharging slurry from said tank.

2. Slurry mixing apparatus as recited in claim 1 wherein said supply pipe is of substantially uniform cross section from said gas jet to said point above the normal upper slurry surface with an open bottom end forming said gas jet.

3. Slurry mixing apparatus as recited in claim 1 wherein said arm has a series of agitating blades spaced radially of said column and disposed in close proximity to the bottom of said tank to rotate with said gas jets by said rotating means and promote slurry mixing at the bottom of said tank.

4. Slurry mixing apparatus as recited in claim 3 wherein said blades are formed in two series, and a gas lift carried by said arm disposed between the two series of blades, the blades in each series being generally parallel and disposed at an angle to the axial length of said slurry mixing arm such that as said arm rotates the blades urge material toward said gas lift.

5. Slurry mixing apparatus adapted for use in wet process cement manufacturing comprising:
   a tank to retain slurry during mixing,
   an upstanding column disposed centrally of said tank,
   a slurry mixing arm rotatably attached to and extending radially from said column,
   rotating means for rotating said slurry mixing arm about said upstanding column,
   gas agitation means comprising downwardly directed gas jets adjacent the bottom of said tank at positions spaced radially from said column and carried by said slurry mixing arm for agitating and mixing said slurry,
   a gas supply header extending along said arm and communicating with each of said gas jets of supplying gas to said jets through a straight length of supply pipe extending from each said gas jets to a point above the normal upper surface of the slurry to be treated, said header communicating laterally with each supply pipe and the upper end of each supply pipe being removably capped whereby upon uncapping the upper end of each supply pipe it and the gas jet is at bottom may be rodded to clear clogging of said jet without emptying the tank, and means for introducing material into said tank and for discharging slurry from said tank.

6. Slurry mixing apparatus as recited in claim 5 wherein a pipe tee having a cap closing the upper open end thereof is provided to connect each said supply pipe to said gas supply header with said supply pipe extending vertically downwardly from the capped upper end of said pipe tee, and valve means is provided between each pipe tee and said supply header.

7. Slurry mixing apparatus adapted for use in wet process cement manufacturing comprising:
a tank to retain slurry during mixing,
an upstanding column disposed centrally of said tank,
a slurry mixing arm rotatably attached to and extending radially from said column,
said slurry mixing arm carrying a series of agitating blades at positions spaced radially from said center column and gas agitation means for jointly mixing the slurry,
material introducing means for said tank comprising a material distribution conduit extending substantially between said column and the periphery of said tank with outlets for material spaced along said conduit, said conduit being mounted to rotate with said arm,
means for rotating said slurry mixing arm about said upstanding column,
and slurry discharge means for said tank.

8. Slurry mixing apparatus as recited in claim 7 further comprising valve means on each of said outlets for individually controlling the material flow therethrough.

9. Slurry mixing apparatus as recited in claim 7 further comprising a hopper mounted above said column to rotate with said arm, said hopper being connected to said material distribution conduit to supply material thereto, and means for feeding material to said hopper.

10. Slurry mixing apparatus adapted for use in wet process cement manufacturing comprising:
a tank to retain slurry during mixing,
an upstanding column disposed centrally of said tank,
a slurry mixing arm rotatably attached to and extending radially from said column, said slurry mixing arm mounting a series of agitating blades disposed in close proximity to the bottom of said slurry tank at positions spaced radially of said column,
rotating means for rotating said slurry mixing arm about said upstanding column,
gas agitation means comprising downwardly directed gas jets adjacent the bottom of said tank at positions spaced radially from said column and carried by said slurry mixing arm for agitating and mixing said slurry,
a gas supply header extending along said arm and communicating with each of said gas jets for supplying gas to said gas jets through a straight length of supply pipe extending from each said gas jet to a point above the normal upper surface of the slurry to be treated, removable cap means overlying the upper end of each supply pipe whereby upon removal of said cap means said pipe and gas jet may be rodded to clear clogging of said jet without emptying the tank,
material introducing means for said tank comprising a material distribution conduit extending substantially between said column and the periphery of said tank with outlets for material spaced along said conduit, said conduit being mounted to rotate with said arm,
means for rotating said slurry mixing arm about said upstanding column,
and slurry discharge means for said tank.

11. Slurry mixing apparatus as recited in claim 10 wherein said tank is cylindrical and said slurry mixing arm comprises a rotatable bridge extending from said upstanding column to the peripheral wall of said tank, and valve means is provided on each of said outlets.

References Cited by the Examiner
UNITED STATES PATENTS

| | | | |
|---|---|---|---|
| 806,214 | 12/1905 | Trent | 259—151 |
| 1,137,294 | 4/1915 | Schroder | 259—151 |
| 1,591,915 | 7/1926 | Lindhard | 259—151 |
| 2,236,434 | 3/1941 | Knowles | 210—528 |
| 2,881,922 | 4/1959 | Kelly | 210—520 |
| 3,151,848 | 10/1964 | Kadden | 259—151 |

WALTER A. SCHEEL, *Primary Examiner.*

R. W. JENKINS, *Assistant Examiner.*